United States Patent
Choi et al.

(10) Patent No.: US 7,604,213 B2
(45) Date of Patent: Oct. 20, 2009

(54) HEIGHT ADJUSTING APPARATUS FOR VEHICLE SEATS

(75) Inventors: Byung Yong Choi, Hwaseong-si (KR); Sang Do Park, Ansan-si (KR); Dong Woo Jeong, Hwaseong-si (KR); Gwang Noh Lee, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/323,956

(22) Filed: Nov. 26, 2008

(65) Prior Publication Data

US 2009/0152433 A1 Jun. 18, 2009

(30) Foreign Application Priority Data

Dec. 14, 2007 (KR) .................. 10-2007-0131010

(51) Int. Cl.
*F16M 13/00* (2006.01)
(52) U.S. Cl. .............. 248/419; 248/421; 248/422; 248/429; 296/68.1
(58) Field of Classification Search .......... 248/157, 248/419, 421, 422, 429; 296/68.1, 65.13, 296/65.14; 297/311, 344.1
See application file for complete search history.

(56) References Cited

U.S. PATENT DOCUMENTS

| | | | | | |
|---|---|---|---|---|---|
| 4,225,177 | A | * | 9/1980 | Kluting | 297/378.11 |
| 5,568,908 | A | * | 10/1996 | Kisiel | 248/419 |
| 5,676,424 | A | * | 10/1997 | Winkelhake | 297/337 |
| 5,882,061 | A | * | 3/1999 | Guillouet | 296/65.05 |
| 2007/0145224 | A1 | * | 6/2007 | Yamada et al. | 248/429 |

* cited by examiner

*Primary Examiner*—Ramon O Ramirez
(74) *Attorney, Agent, or Firm*—Morgan, Lewis & Bockius LLP

(57) ABSTRACT

A height adjusting apparatus for vehicle seats may include seat side frames provided on both side ends of a seat part of a seat, each of the seat side frames connected to the seat bracket via a front link and a rear link, the support rod coupling the seat side frames to each other, the pinion gear provided on a seat side frame, the rack gear link having on one end thereof a rack gear which engages with an upper end of the pinion gear, and coupled at the other end thereof to a hinge of the front link placed on the seat bracket, so that, when the pinion gear is driven, the rack gear link pulls the seat side frame forwards to lift it up, and the support pin provided on the seat side frame in such a way as to be placed above the rack gear.

8 Claims, 4 Drawing Sheets

[FIG 1A]
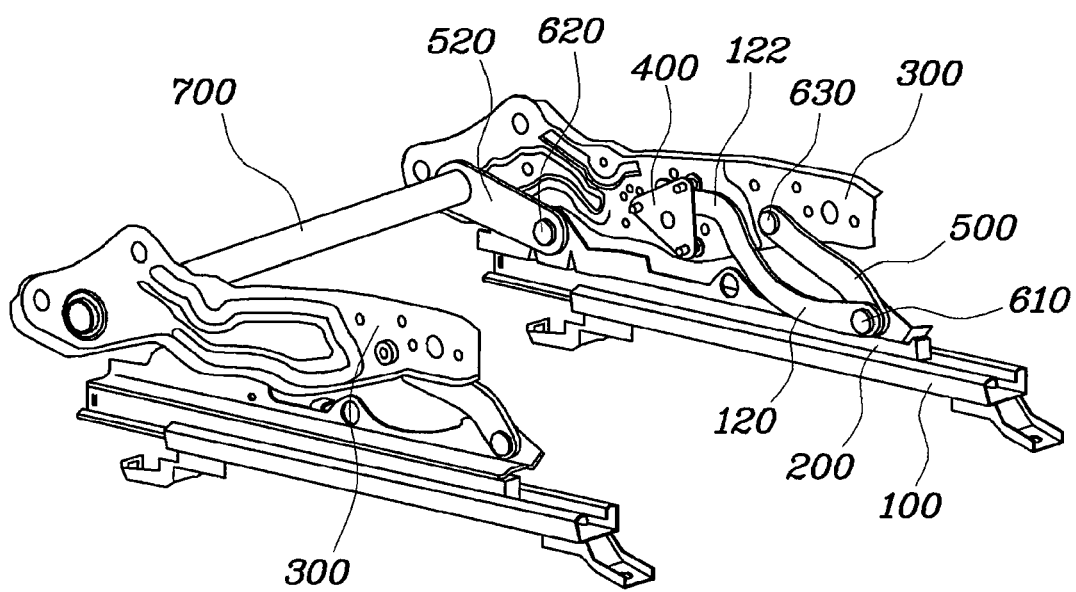

[FIG 1B]
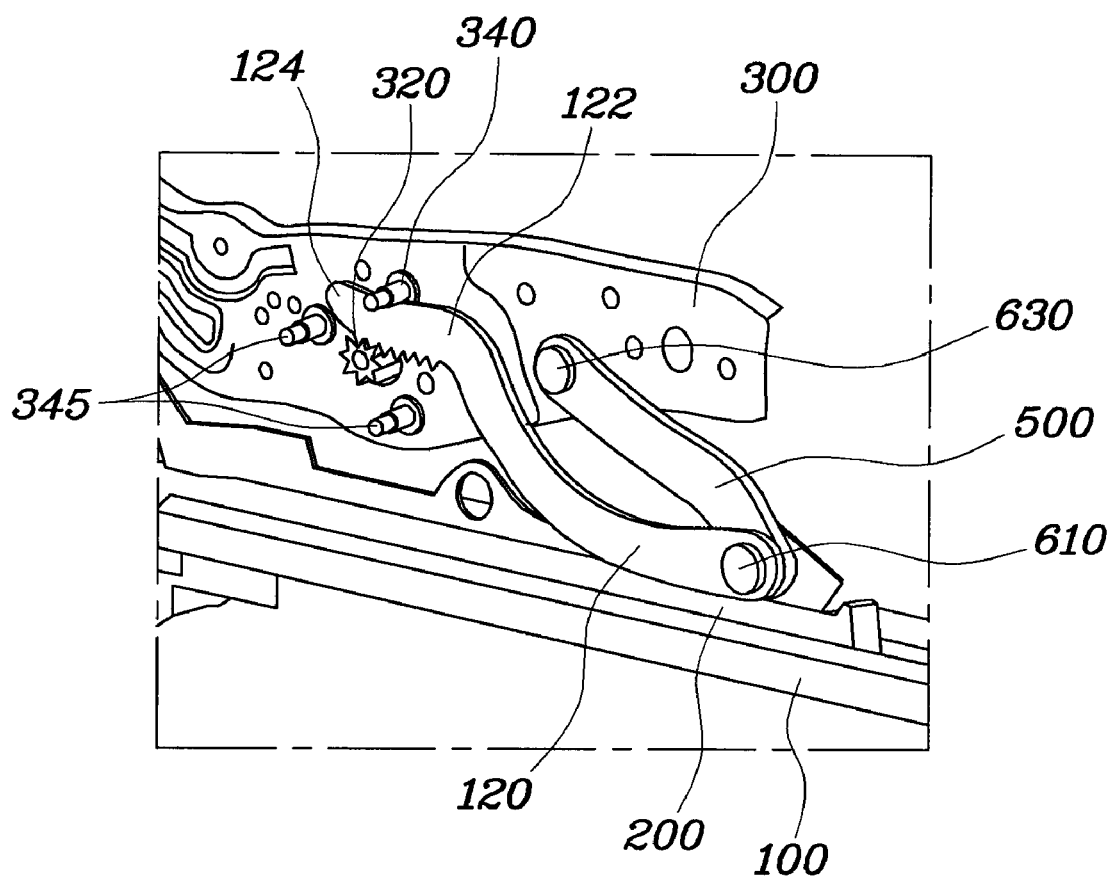

[FIG 2A]
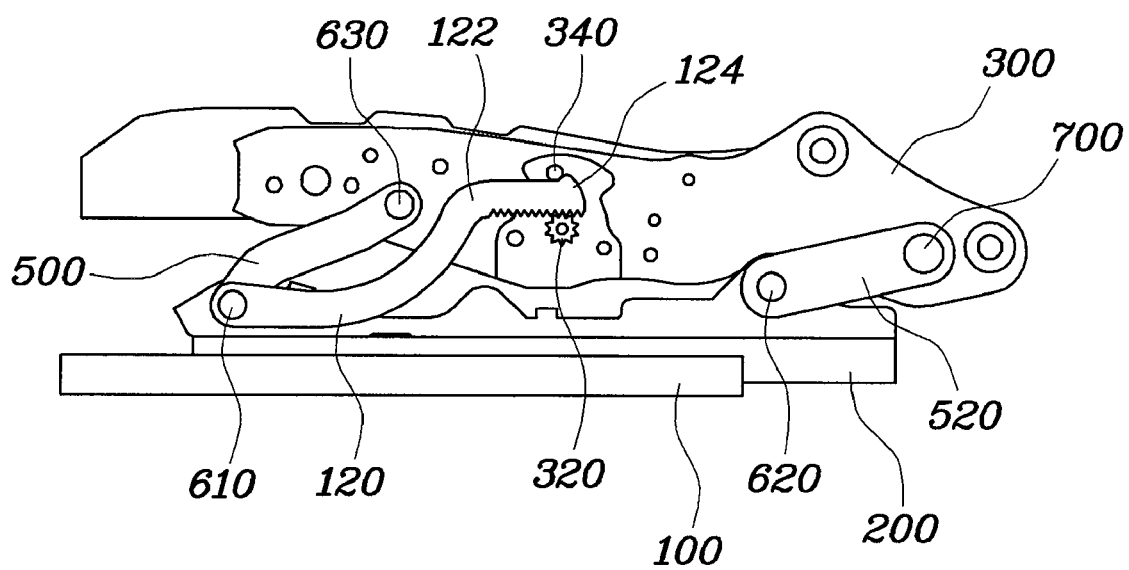

[FIG 2B]
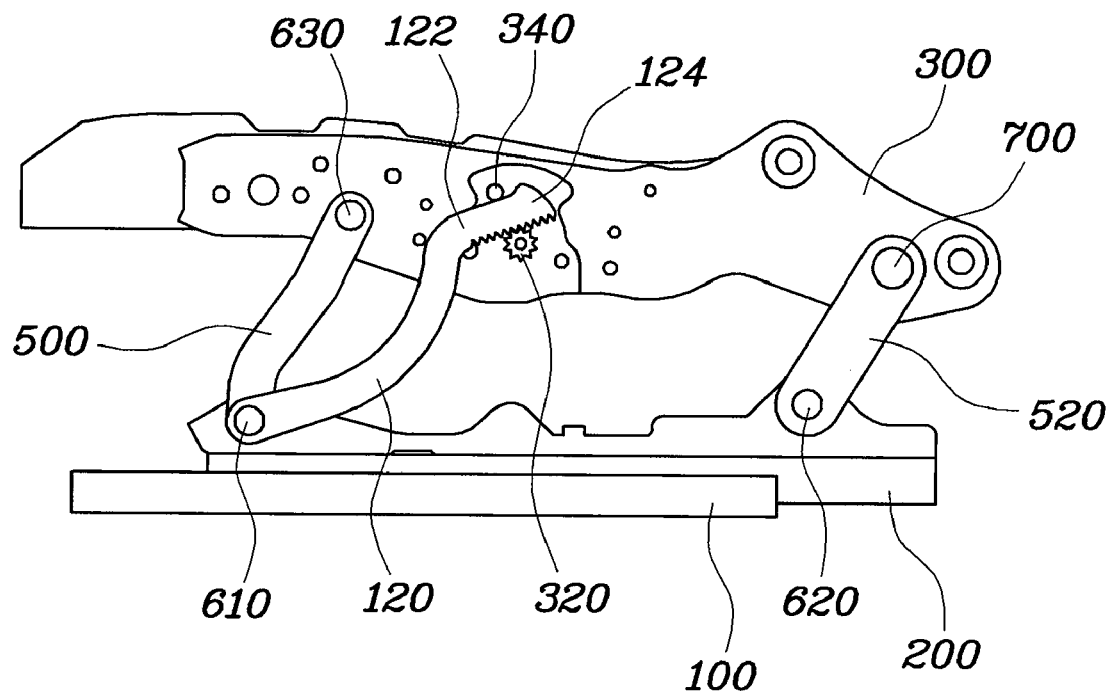

HEIGHT ADJUSTING APPARATUS FOR VEHICLE SEATS

CROSS-REFERENCE TO RELATED APPLICATIONS

This application claims priority to Korean Application No. 10-2007-0131010, filed on Dec. 14, 2007, the disclosure of which is incorporated herein by reference.

BACKGROUND OF THE INVENTION

1. Field of the Invention

The present invention relates to a height adjusting apparatus for vehicle seats, and more particularly, a height adjusting apparatus for vehicle seats which is provided on a lower seat frame so as to adjust the height of a vehicle seat.

2. Description of the Related Art

As well known to those skilled in the art, a vehicle seat includes a seat part, which is placed underneath a passenger's buttocks to support the buttocks, and a back part, which supports the passenger's back. Conventionally, in order to tilt the back part backwards or straighten up the back part, a manual control device is provided. Further, in order to ensure legroom, the seat is constructed so that its seat part moves forwards or backwards. These days, such operation of the seat is performed using a motor and a gear assembly.

In a conventional vehicle seat, seat brackets, which are installed in a vehicle, are coupled to seat side frames provided on both side ends of a seat part, via links. In order to adjust the height of the seat, a gear assembly is mounted to the lower portion of the seat part, thus moving the seat part up and down by the rotation of a motor.

The conventional height adjusting apparatus for the vehicle seat is constructed so that a pinion gear is mounted to each seat side frame, and a rack gear is mounted to each link. Thereby, when the pinion gear is driven by the motor, the pinion gear is operated in conjunction with the rack gear, thus moving the seat part up or down.

However, the conventional height adjusting apparatus is problematic in that the seat cannot withstand inertia occurring in the event of a head-on collision, so that the raised seat is undesirably dislodged and quickly lowered, thus threatening the safety of a passenger. This is because the meshing force of the rack gear with the pinion gear is structurally weak.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a height adjusting apparatus for vehicle seats, with which it is possible to adjust the height of a seat, and prevent the disengagement of a pinion gear from a rack gear even in the event of a head-on collision, thus maintaining the height of the seat, therefore protecting the safety of a passenger.

More specifically, exemplary embodiments of the present invention may provide a height adjusting apparatus for vehicle seats, including: a seat bracket configured to mount a seat to a vehicle; a base frame configured to be slidably mounted to the seat bracket; seat side frames provided on both side ends of a seat part of the seat to support the seat part, each of the seat side frames being coupled to the seat bracket via a front link and a rear link; a support rod for coupling the seat side frames to each other; a pinion gear provided on an associated seat side frame to adjust a height of the seat part; a rack gear link having on a first end thereof a rack gear which engages with an upper end of the pinion gear, and coupled at a second end thereof to a hinge of the front link which is placed on the base frame, so that, when the pinion gear is driven, the rack gear link pulls the seat side frame rearwards to lift it up; and a support pin provided on the seat side frame in such a way as to be placed above the rack gear, and maintaining engagement of the rack gear with the pinion gear.

A stopper protrusion may be provided on an end of the rack gear, and is stopped by the support pin, thus preventing removal of the rack gear in lowered state of the seat part.

In another exemplary embodiment of the present invention, a height adjusting apparatus for vehicle seats, may comprise: a seat bracket configured to mount a seat to a vehicle; a base frame configured to be slidably mounted to the seat bracket; seat side frames provided on both lateral sides of a seat part of the seat to support the seat part; a front link pivotally coupling front portion of the base frame and front portion of the seat side frame; at least a rear link pivotally coupling rear portion of the base frame and rear portion of the seat side frame; a support rod pivotally coupling rear portions of both seat side frames; a pinion gear provided on one of the seat side frames to adjust a height of the seat part; a rack gear link wherein a first end of the rack gear link engages with an upper portion of the pinion gear, and a second end of the rack gear link is co-axially coupled to a lower portion of the front link which is coupled to the base frame; and a support pin provided on the seat side frame, the support pin placed above the rack gear in vertical direction and between lower end portion of the front link and the pinion gear in horizontal direction, and maintaining engagement of the rack gear with the pinion gear.

The rack gear link may be shaped of "S" and longitudinal direction of the rack gear is substantially linear in longitudinal direction of the base frame in lowered state of the seat part.

Upper portions of both front links coupled to seat side frames respectively may be coupled to each other by the support rod.

A stopper protrusion may be provided on a distal end portion of the rack gear, and is stopped by the support pin, thus preventing removal of the rack gear in lowered state of the seat part.

The pinion gear may be coupled to a motor which is controlled by a controller to regulate rotational direction and displacement of the pinion gear.

The pinion gear and the rack gear of the rack gear link may be covered by a protection cover wherein the protection cover is supported by the support pin and at least a connection pin formed on the seat side frames.

The information disclosed in this Background of the Invention section is only for enhancement of understanding of the background of the invention and should not be taken as an acknowledgement or any form of suggestion that this information forms the prior art that is already known to a person skilled in the art.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein:

FIGS. 1A and 1B are perspective views showing a height adjusting apparatus for vehicle seats, according to an embodiment of the present invention, in which FIG. 1A is a perspective view showing the entire height adjusting apparatus, and FIG. 1B is a perspective partial view showing apart of the height adjusting apparatus of FIG. 1A; and FIGS. 2A and 2B are views illustrating the operation of the height adjusting apparatus for vehicle seats, according to the embodiment of the present invention, in which FIG. 2A is a view showing the state in which a seat part is lowered, and FIG. 2B is a view showing the state in which the seat part is lifted up.

In the figures, reference numbers refer to the same or equivalent parts of the present invention throughout the several figures of the drawing.

DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Referring to FIGS. 1A and 1B, the structural features of the height adjusting apparatus for the vehicle seat, according to an embodiment of the present invention, will be described.

FIG. 1A is a perspective view showing the state in which the height adjusting apparatus is installed.

The height adjusting apparatus includes seat brackets 100, which are mounted to the floor in a vehicle so as to support the seat. Base frame 200 is slidabley provided on upper portion of the seat bracket 100. Seat side frames 300 are provided on both lateral sides of a seat part. Each seat side frame 300 is coupled to a corresponding base frame 200 via a front link 500 and a rear link 520. In detail, the front link 500 positioned in front direction of the seat is coupled to front portion of the seat side frame 300 by an upper hinge 630 and to the base frame 200 by a lower hinge 610.

In this configuration, when the front and rear links 500 and 520 rotate forwards with respect to lower hinges 610 and 620, each seat side frame 300 is moved up in response to rotation of the front link 500 and the rear link 520. Reversely, when the front and rear links 500 and 520 rotates backwards with respect to lower hinges 610 and 620, each seat side frame 300 is moved down.

Further, the seat side frames 300, which are provided on the lateral sides of the seat part, are coupled to each other via a support rod 700. Accordingly since the support rod 700 is coupled to both seat side frames 300 together, a rotation of one seat side frame 300 moves up and down the other seat side frame 300 simultaneously. In addition, upper portion of the rear link 520 is rotatably coupled to rear portion of the seat side frame 300 by the support rod 700 and to rear portion of the base frame 200 by a lower hinge 620.

FIG. 1B is a perspective partial view showing a part of the present invention, that is, a gear assembly as an exemplary embodiment of the present invention.

Referring to FIG. 1B, a pinion gear 320 is provided substantially at the central portion of the seat side frame 300, and upper end portion of the rack gear link 120 is engaged to the pinion gear 320 at a predetermined position as explained hereinafter.

In an exemplary embodiment of the present invention, the upper end portion of the rack gear link 120 is formed of rack gear 122 to engage with upper portion of the pinion gear 320, and the other end portion of the rack gear link 120 is coupled to the lower hinge 610 positioned at front portion of the base frame 200. Accordingly, the other end portion of the rack gear link 120 and lower end of the front link 500 are coaxially coupled by the lower hinge 610.

In an exemplary embodiment of the present invention, a support pin 340 is provided above the pinion gear 320 in vertical direction. In horizontal direction the support pin 340 is positioned between the pinion gear 320 and lower end portion of the front link 500, thus pivotally supports the rack gear 122 to be operated while being held between the support pin 340 and the pinion gear 320 as explained later.

Further, a stopper protrusion 124 protrudes upwards from one distal end portion of the rack gear 122 and is stopped by the support pin 340 when the pinion gear 320 is rotated maximally, i.e., in the state that the seat part is lowered, thus preventing rack gear 122 from leaving apart from the pinion gear 320.

In an exemplary embodiment of the present invention, the seat side frame 300 further comprises at least a connection pin 345 and a protection cover 400 as shown in FIG. 1A. The protection cover 400 is mounted on the connection pins 345 and the support pin 340 and covers the pinion gear 320 and the rack gear of the rack gear link 120 in order to prevent the pinion gear 320 and rack gear 122 from leaving apart from the seat side frame 300.

The operating principle of the height adjusting apparatus according to the present invention will be described below with reference to FIGS. 2A and 2B.

FIG. 2A shows the state in which the seat part is located at a bottom dead point.

Once the base frame 200 is fixed to the seat bracket 100, cogged lower portion of the rack gear 122 of the rack gear link 120 engages with the pinion gear 320, and the stopper protrusion 124 of the rack gear 122 is stopped by the support pin 340.

In an exemplary embodiment of the present invention, the rack gear link 120 is shaped of "S" and the rack gear 122 of the rack gear link 120 is formed to be linear in horizontal direction such that the longitudinal direction of the rack gear 122 is substantially parallel to longitudinal direction of the base frame 200 when the seat part is positioned at bottom dead point.

FIG. 2B shows the state in which the seat part is located at a top dead point.

To change the seat part from a bottom dead point as shown in FIG. 2A to a top dead point, the pinion gear 320 is rotated clockwise by a motor (not shown) in drawing. As the pinion gear 320 is rotated clockwise, the rack gear 122 is pulled to the left direction in drawing and thus the front link 500 and the rear link 520 are unfolded as rotating counterclockwise, so that the seat side frame 300 is moved forward while being lifted up as shown in FIG. 2B.

After that, the engagement of the rack gear 122 with the pinion gear 320 is maintained by the support pin 340 which is positioned above the pinion gear 320 in vertical direction and between the pinion gear 320 and lower end portion of the front link 500 in horizontal direction.

Since the support pin 340 is positioned between the pinion gear 320 and lower end portion of the front link 500 in horizontal direction, as the seat part (not shown) is pressed downward by user or self-weight of the seat, load applied to the support pin 340 is opposite to the direction of reactive forces acted on the lower hinge 610 and the pinion gear 320 by rack gear link 120. Further since the support pin 340 is spaced from the pinion gear 320 with a predetermined distance, the rotational moment of the reactive forces acted on the lower hinge 610 and the pinion gear 320 is balanced with respect to the support pin 340. Accordingly, the seat side frame 300 is locked by the support pin 340.

In the event of a head-on collision, the seat is usually biased toward the front of the vehicle due to inertia. However, in an exemplary embodiment of the present invention, since the rack gear 122 is formed to be linear substantially in parallel to the longitudinal direction of the base frame 200 at the bottom dead point of the seat as shown in FIG. 2A, the rack gear link 120 positioned between the pinion gear 320 and the front link 500 can absorb the inertia of vehicle effectively. Further since the rack gear link 120 is shaped of "S", the rack gear link 120 can absorb the bending moment acted by the inertia of the car mass effectively.

Therefore, the height adjusting apparatus prevents the seat from being biased forwards because of the disengagement of the pinion gear from the rack gear, thus ensuring the safety of a passenger In contrast, in the case of the conventional art, when the seat is positioned at the bottom dead point and an impact is applied to the front of the vehicle, the engagement of the rack gear and the pinion gear of the conventional gear assembly is undesirably released, and thus the seat is easily dislodged.

As described above, the present invention provides a height adjusting apparatus for vehicle seats, with which it is possible to adjust the height of a seat using a rack gear and a pinion gear, and maintains the engagement of the rack gear and the pinion gear even m the event of a head-on collision, thus fixing the seat at a desired height, and ensuring the safety of a passenger.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A height adjusting apparatus for vehicle seats, comprising:
   a seat bracket configured to mount a seat to a vehicle;
   a base frame configured to be slidably mounted to the seat bracket;
   seat side frames provided on both side ends of a seat part of the seat to support the seat part, each of the seat side frames being coupled to the seat bracket via a front link and a rear link;
   a support rod for coupling the seat side frames to each other;
   a pinion gear provided on an associated seat side frame to adjust a height of the seat part;
   a rack gear link having on a first end thereof a rack gear which engages with an upper end of the pinion gear, and coupled at a second end thereof to a hinge of the front link which is placed on the base frame, so that, when the pinion gear is driven, the rack gear link pulls the seat side frame forwards to lift it up; and
   a support pin provided on the seat side frame in such a way as to be placed above the rack gear, and maintaining engagement of the rack gear with the pinion gear.

2. The height adjusting apparatus as set forth in claim 1, wherein a stopper protrusion is provided on an end of the rack gear, and is stopped by the support pin, thus preventing removal of the rack gear in lowered state of the seat part.

3. A height adjusting apparatus for vehicle seats, comprising:
   a seat bracket configured to mount a seat to a vehicle;
   a base frame configured to be slidably mounted to the seat bracket;
   seat side frames provided on both lateral sides of a seat part of the seat to support the seat part;
   a front link pivotally coupling front portion of the base frame and front portion of the seat side frame;
   at least a rear link pivotally coupling rear portion of the base frame and rear portion of the seat side frame;
   a support rod pivotally coupling rear portions of both seat side frames;
   a pinion gear provided on one of the seat side frames to adjust a height of the seat part;
   a rack gear link wherein a first end of the rack gear link engages with an upper portion of the pinion gear, and a second end of the rack gear link is co-axially coupled to a lower portion of the front link which is coupled to the base frame; and
   a support pin provided on the seat side frame, the support pin placed above the rack gear in vertical direction and between lower end portion of the front link and the pinion gear in horizontal direction, and maintaining engagement of the rack gear with the pinion gear.

4. The height adjusting apparatus as set forth in claim 3, wherein the rack gear link is shaped of "S" and longitudinal direction of the rack gear is substantially linear in longitudinal direction of the base frame in lowered state of the seat part.

5. The height adjusting apparatus as set forth in claim 3, wherein upper portions of both front links coupled to seat side frames respectively are coupled to each other by the support rod.

6. The height adjusting apparatus as set forth in claim 3, wherein a stopper protrusion is provided on a distal end portion of the rack gear, and is stopped by the support pin, thus preventing removal of the rack gear in lowered state of the seat part.

7. The height adjusting apparatus as set forth in claim 3, wherein the pinion gear is coupled to a motor which is controlled by a controller to regulate rotational direction and displacement of the pinion gear.

8. The height adjusting apparatus as set forth in claim 3, wherein the pinion gear and the rack gear of the rack gear link is covered by a protection cover wherein the protection cover is supported by the support pin and at least a connection pin formed on the seat side frames.

* * * * *